United States Patent [19]

Atwood

[11] 4,113,849
[45] Sep. 12, 1978

[54] RECOVERING SULFUR FROM GAS STREAMS CONTAINING HYDROGEN SULFIDE

[75] Inventor: Gilbert Richard Atwood, Briarcliff Manor, N.Y.

[73] Assignee: Union Carbide Corporation, New York, N.Y.

[21] Appl. No.: 781,206

[22] Filed: Mar. 25, 1977

[51] Int. Cl.$^2$ .................................... C01B 17/00
[52] U.S. Cl. ............................ 423/574 R; 423/242
[58] Field of Search ............ 423/574, 242, 539; 210/37 R; 55/73

[56] References Cited

U.S. PATENT DOCUMENTS

| 3,798,316 | 3/1974 | Beavon ............................... 423/574 |
| 3,879,521 | 4/1975 | Anderson ............................ 423/242 |
| 3,896,215 | 7/1975 | Bratzler et al. ..................... 423/574 |
| 3,911,093 | 10/1972 | Sherif ................................ 423/574 |
| 3,914,387 | 10/1975 | Von Jordan ........................ 423/242 |
| 3,962,405 | 6/1976 | Annesser ............................ 423/242 |

FOREIGN PATENT DOCUMENTS

| 1,127,534 | 4/1962 | Fed. Rep. of Germany ........ 210/37 R |
| 1,950,603 | 4/1971 | Fed. Rep. of Germany ........... 423/228 |

*Primary Examiner*—G. O. Peters
*Attorney, Agent, or Firm*—Dominic J. Terminello

[57] ABSTRACT

Process for the recovery of sulfur from gas streams containing hydrogen sulfide comprising the steps of reacting a portion of the hydrogen sulfide with sulfur dioxide in a Claus reaction to form sulfur, removing the sulfur, incinerating the residual hydrogen sulfide in the resulting gas stream to sulfur dioxide, absorbing the sulfur dioxide in the incinerated gas stream in an aqueous absorbent solution, stripping the sulfur dioxide from the aqueous absorbent solution, recycling the stripped sulfur dioxide for reaction with succeeding portions of hydrogen sulfide in the incoming gas stream, re-contacting the stripped aqueous absorbent solution with succeeding portions of the incinerated gas stream to absorb additional sulfur dioxide, regenerating a portion of the aqueous absorbent solution to remove heat stable sulfur oxyanions therefrom by contacting said solution with an anion exchange resin and re-contacting the regenerated aqueous absorbent solution with said incinerated gas stream to absorb additional sulfur dioxide.

2 Claims, 2 Drawing Figures

RECOVERING SULFUR FROM GAS STREAMS CONTAINING HYDROGEN SULFIDE

BACKGROUND OF THE INVENTION

1. Field Of The Invention

This invention relates to novel processes for removing gaseous sulfur compounds including hydrogen sulfide from gas streams containing same to recover sulfur and to render said gas streams more environmentally acceptable and less harmful to catalysts used in subsequent operation on said gas streams. The field of this invention includes those industrial processes employed in the manufacture of synthesis gas for synthetic liquid or gaseous fuels and other chemicals.

2. Description Of The Prior Art

Synthesis gas is generally produced by the controlled oxidation of gaseous, liquid or solid fuels such as natural gas, petroleum or coal. It is essential to remove sulfur which is predominantly in the form of hydrogen sulfide prior to further treatment of the gases in order to avoid contamination or poisoning of catalysts used in such further treatments and in order to provide a more environmentally acceptable product. Sulfur removal is frequently achieved by treating the gas with a suitable absorbent solution, for example, of strong organic bases, which absorb $H_2S$ and $CO_2$ and in some cases other gaseous sulfur compounds such as COS and $CS_2$. The loaded absorbent solution is stripped by heat, releasing an acid gas containing $H_2S$, $CO_2$ and the other gaseous sulfur compounds, if present. The acid gas, in some cases, is disposed of by incineration producing combustion gases high in $SO_2$ content and thus environmentally unacceptable. In other cases, they are subjected to the Claus reaction to recover some of the sulfur; but this procedure is expensive and/or also results in tail gases containing amounts of $H_2S$ and $SO_2$ which render them environmentally unacceptable.

U.S. Pat. No. 3,896,215 discloses a process for removing hydrogen sulfide from a gas stream containing it by reacting it with $SO_2$ in a Claus reaction, afterburning the effluent gas to convert the sulfur content to sulfur dioxide and sulfur trioxide, reducing the sulfur trioxide content to sulfur dioxide, thereafter absorbing the sulfur dioxide content in an absorbent such as disodium hydrogen phosphate and desorbing the sulfur dioxide and returning it to the Claus reaction. The process of this patent makes no provision for the removal of heat stable salts formed in the absorption-desorption cycle used to remove sulfur dioxide and the disodium hydrogen phosphate becomes loaded with heat stable salts of sulfur oxyanions and thus becomes less effective in recovering sulfur dioxide. The build-up of heat stable salts in the absorbent, in fact, is considerably encouraged by the use of high temperatures in the regeneration (stripping) tower pursuant to the teachings of this patent. As a consequence, less and less sulfur dioxide is recycled to the Claus process and the system steadily becomes more unbalanced requiring constant adjustments to the inputs and operating conditions in the various units in the system and ultimately complete loss of effectiveness of the $SO_2$-absorbent. The patent also fails to provide means for handling gas streams having excessive amounts of $H_2S$ without enlarging or overloading the Claus reactor.

There are a number of prior art methods for recovering sulfur oxides from gases containing them by absorbing and/or reacting the sulfur oxides with inorganic reagents, e.g., sodium carbonate, sodium hydroxide, ammonium hydroxide, aqueous ammonia, other alkali metal or alkaline earth metal hydroxides or carbonates and the like, in solution, slurry or powder form to yield the corresponding sulfate and sulfite salts (see, for example, U.S Pat. No. 1,908,731). In many of these processes, the absorbing solutions are regenerated by heating, in a separate vessel, thus liberating concentrated $SO_2$. This desorption step does not, however, remove any sulfate, thiosulfates or polythionates that result from absorption of the sulfur trioxide and thermal disproportionation of sulfite and bisulfite and which eventually build up in the system.

In many of these cases, the reagent cannot be readily regenerated without the expenditure of considerable amounts of energy or considerable amount of other reagents. In those instances where a regenerated absorbent can be used, the sulfate concentration in the absorbent builds up both by absorption of sulfur trioxide or sulfuric acid mist which might be and usually are present in the stack gas and by oxidation of dissolved sulfur dioxide by the reaction of oxygen which is also sometimes present in the gas contacted with the absorbent. A further source of the build up of sulfates and/or other sulfur oxyanions of heat stable salts is disproportionation of dissolved sulfites and bisulfites in contact with dissolved sulfur dioxide. Such heat stable salts include, in addition to the sulfates, $SO_4^=$; the thiosulfates, $S_2O_3^=$; the dithionates, $S_2O_6^=$; the trithionates, $S_3O_6^=$; and other higher polythionates, $S_xO_6^=$, and other divalent sulfur oxyanion-containing heat stable salts. The sulfates usually can be removed essentially quantitatively through the use of an alkali metal hydroxide equivalent to twice the molar concentration of the sulfate resulting in substantially quantitative precipitation of the sulfate as the di-alkali metal salt without precipitation of sulfite or bisulfite ions. However, the other divalent sulfur oxyanions of strong acids such as the thiosulfates, dithionates and higher polythionates also build up in the system and cannot be quantitatively removed by means of alkali metal hydroxide precipitation. Furthermore, the presence of such other divalent sulfur oxyanions of heat stable salts actively interferes with the quantitative removal of the sulfates.

In some instances, as in U.S. Pat. No. 3,503,185, the gas was prewashed to remove sulfates which were then purged from the system. In this type of system, as with the use of coke in U.S. Pat. No. 3,896,215, it is sought to eliminate sulfur trioxide content of the gas before contact with the $SO_2$ absorbent. Such prewashes were not capable of removing all sulfur trioxide as sulfate and, of course, would not remove sulfates formed in other parts of the $SO_2$-recovery system. This patent, furthermore, does not disclose any means for eliminating the thiosulfates, dithionates and higher polythionates. U.S. Pat. No. 3,790,660 is similar in showing a water prewash to remove sulfur trioxide and fly ash. It specifies a sulfate purge stream to remove the sulfate; unfortunately, a considerable amount of the alkali metal sulfite and bisulfite also accompany the sulfate. This requires a considerable addition of alkali metal hydroxide to make up for the loss. Furthermore, there is no system disclosed for removing the thiosulfates, dithionates or other polythionates except by purging them with the sulfate in a waste stream. The waste stream itself is relatively dilute and poses a pollution problem in disposing of it which is difficult and expensive to handle.

The use of alkanolamines, such as trialkanolamines, has been found to be a highly efficient way of absorbing sulfur dioxide from gases in a cycle in which the alkanolamine solvent contacts the waste gas to absorb the sulfur oxides and is thereafter stripped by heat to release the sulfur dioxide as a gas whereupon it is collected for safe disposal. The stripped alkanolamine is then recycled back to the absorber for further contact with incoming waste gases and further absorption of sulfur oxide. This type of system is disclosed in U.S. Pat. Nos. 3,620,674 and 3,904,735. Heat stable salts, such as those mentioned hereinabove, accumulate in the recycling absorbent to a troublesome extent and must be removed in order to maintain the absorbing capability of the absorbent. The latter patent does disclose a sulfate purge cycle in which a portion of the lean absorbent is treated with potassium hydroxide or potassium carbonate to precipitate out the sulfate as potassium sulfate. While this type of purge system is quite effective in removing sulfates, it is severely limited in removing other heat stable salts or their divalent sulfur oxyanions, which also seem to interfere, however, with the sulfate removal. Furthermore, large amounts of wet sulfates are produced and create a severe disposal problem. There does not appear to be any provision made in U.S. Pat. No. 3,620,674 for removing the heat stable salts and/or their sulfur oxyanions from the absorbent which gradually but inevitably loses effectiveness because of the accumulation of heat stable salts therein.

Anion exchange resins have been used in the past to separate sulfur dioxide from gas mixtures. An example of prior art of this type is U.S. Pat. No. 3,330,621 which utilizes a mass of solid pyridine group-containing particles to contact the sulfur dioxide-containing gas to bind the sulfur dioxide as sulfite groups to the pyridine groups. Thereafter, oxygen is added to oxidize the sulfite groups on the pyridine groups to form sulfate groups. Then, the sulfate groups on the pyridine groups are treated with ammonia to form ammonium sulfate which is then recovered and the pyridine group-containing particles are recycled for re-contact with the $SO_2$-containing gases. This type of prior art process involves the use of extremely high quantities of anion exchange resin and excessively large quantities of ammonia and/or other reagents and presents a disposal problem for the large quantities of ammonium sulfate which are produced because the total quantity of sulfur dioxide in the gas is converted via the pyridine group-containing particles into ammonium sulfate.

Anion exchange resins have also been used to treat the total amount of a recyling absorbent, such as sodium hydroxide or ammonium bisulfite. In U.S. Pat. No. 3,896,214, the sulfur dioxide and sulfur trioxide in the gases are washed with sodium hydroxide to convert substantially all the sulfur dioxide and sulfur trioxide content thereof into sodium bisulfite and/or sodium sulfite and sodium sulfate which are then contacted with a hydroxyl-containing weak base or strong base anion exchange resin to substitute the hydroxyl groups on the resin with the bisulfite, sulfite and sulfate anions thereby regenerating the sodium hydroxide. The resulting resin sulfate, sulfite and/or bisulfite is regenerated by treatment with aqueous lime hydrate to form calcium sulfate and calcium sulfite and/or calcium bisulfite and to substitute hydroxyl anions on the resin. The calcium salts are removed as a sludge by dewatering. In U.S. Pat. No. 3,833,710, aqueous ammonium sulfite is used as an absorbent and is converted to aqueous ammonium bisulfite after picking up the sulfur dioxide in the gas. The aqueous ammonium bisulfite solution is contacted with a weak base anion exchange resin in the hydroxyl form to convert the resin to the bisulfite form and regenerate the ammonium sulfite absorbent solution. Both this and U.S. Pat. No. 3,896,214 are based on the removal from the gases of the total amount of the $SO_2$ content as well as the $SO_3$ content by utilizing ion exchange. This requires the utilization of extremely large amounts of anion exchange resins which are expensive and also requires the use of extremely large amounts of reagents to regenerate the anion exchange resin which is not only expensive but presents a considerable waste disposal problem for liquid wastes that are relatively quite dilute when consideration is given to the need for washing the resin after each liquid pass during regeneration. Furthermore, the $SO_2$ content is rendered unavailable for recycle.

U.S. Pat. No. 2,713,077 discloses the use of strong base anion exchange resins to remove carbonyl sulfides from hydrocarbon fluids, such as hydrocarbon gases, produced by the thermal or catalytic cracking of petroleum oils or by the reaction of steam with coke or hydrocarbons. U.S. Pat. No. 3,297,401 removes arsenic and iron contamination from phosphoric acid preparations with a weak base liquid anion exchange resin. In each of these patents the spent anion exchange resin can be regenerated with sodium hydroxide. Neither patent relates to the removal of sulfur dioxide and heat stable salts from gases containing them or their ingredients.

Other prior art processes for removing hydrogen sulfide from gases containing it and recovering sulfur are disclosed in U.S. Pat. No. 3,561,925 and 3,598,529. The reaction of sulfur dioxide and hydrogen sulfide is carried out in a solvent phase in U.S. Pat. No. 3,598,529 and no provision is made for recovering and recycling $SO_2$. In U.S. Pat. No. 3,561,925 sulfur dioxide is reacted with ammonium sulfide (produced by washing the $H_2S$-containing gases with ammonia and water) to form sulfur and regenerate ammonia.

A complex series of chemical reactions is employed in U.S. Pat. No. 3,719,742 to reduce metal pyrosulfites to the corresponding metal sulfides which are converted to the corresponding metal carbonate and hydrogen sulfide. Included, in one embodiment, is the Claus reaction for producing sulfur from the $H_2S$ formed in the conversion to the metal carbonate and the $SO_2$ formed during the reduction to the metal sulfide or obtained by burning some of the $H_2S$. There is no disclosure, however, of incinerating the tail gas from the Claus reactor to convert traces of $H_2S$ to $SO_2$, recovering the $SO_2$ and recycling it to the Claus reactor.

There are also prior processes for removing sulfur oxide from industrial fumes wherein $H_2S$ is utilized as a reagent for removing sulfur oxides which are dissolved in solvents such as alkali metal bisulfites, aqueous ammonia or ammonium sulfite. Prior art processes of this type are exemplified by those described in U.S. Pat. Nos. 3,833,710; 3,883,638 and 3,839,549, but they are not concerned with the removal of hydrogen sulfide from gases containing it.

SUMMARY OF THE INVENTION

The present invention provides processes for the removal of hydrogen sulfide and the recovery of sulfur from gas streams containing hydrogen sulfide wherein:

(a) a portion of the $H_2S$ contained in the gas stream is reacted with $SO_2$ in a Claus reaction to produce sulfur, water, and a second gas stream containing said sulfur, water and small amounts of unreacted $H_2S$ and $SO_2$;

(b) the sulfur is condensed and removed from the second gas stream;

(c) thereafter the unreacted $H_2S$ in the second gas stream is oxidized to sulfur dioxide and water thereby forming a tail gas stream containing $SO_2$ as essentially the only sulfur compound;

(d) the tail gas stream then is contacted with a mainstream of an aqueous absorbent solution containing as an absorbent an alkanolamine, an alkali metal hydroxide, ammonium hydroxide, an alkanolamine sulfite, an alkali metal sulfite or ammonium sulfite to remove sulfur dioxide from said tail gas and form a rich aqueous absorbent solution enriched in sulfur dioxide removed from said tail gas;

(e) a mainstream of said rich aqueous absorbent soltuion is moved to a stripping zone where it is stripped of sulfur dioxide to form a lean aqueous absorbent solution depleted in sulfur dioxide content, and (f) the sulfur dioxide removed in the preceding step (e) is recirculated to step (a) for reaction with hydrogen sulfide in the Claus reaction;

(g) a mainstream of said lean aqueous absorbent solution is recycled from the stripping zone of step (e) to step (d) and re-contacted with said tail gas;

(h) a portion of said aqueous absorbent solution containing divalent sulfur oxyanions of heat stable salts which accumulate in said aqueous absorbent solution is separated from one of said mainstreams, (i) said separated portion is contacted with an anion exchange resin having anions displaceable by said divalent sulfur oxyanions of heat stable salts to remove same from said portion whereby the anions of the resin are replaced by said divalent sulfur oxyanions of heat stable salts, (j) returning said portion after contact with said anion exchange resin to one of said mainstreams. In the process the anion exchange resin is regenerated by contacting it with an aqueous inorganic hydroxide to replace the divalent sulfur oxyanions of heat stable salts on said resin with hydroxyl anions thereby forming a waste stream containing said divalent sulfur oxyanions of heat stable salts which can be readily disposed of in any suitable manner.

The present invention is based on a system by which the conventional Claus process for converting hydrogen sulfide to sulfur is combined with tail gas incineration and a sulfur dioxide removal to achieve very high (95 to 99.5%) overall yields of elemental sulfur and minimum sulfur compound emissions. The concept of treating Claus tail gases is not new, but the improvement thereon made possible by this invention comprises the designing and operating of the Claus process for low yield per pass (for example, 65% based on $H_2S$ content) so that the incinerated tail gas can provide substantially all of the sulfur dioxide required to react with the hydrogen sulfide in the Claus reactor. Economic advantages are obtained particularly in the case of dilute hydrogen sulfide feed streams, which streams may otherwise require several sequential Claus stages followed by tail gas treatment to reduce sulfur compound emissions to acceptable levels. Such streams may even be too dilute to permit convenient partial oxidation of the $H_2S$ to provide the necessary $SO_2$ for the Claus reaction. In such cases one needs a separate source of $SO_2$, for example, burning a part of the sulfur product. This invention eliminates that need as disclosed below.

This invention is especially concerned with the problem of environmental atmospheric pollution. More specifically it is concerned with the problem of sulfur compounds which may be incorporated in a variety of effluent gases from natural and industrial sources. It is concerned especially with those circumstances in which hydrogen sulfide is incorporated in carbon dioxide containing streams at a ratio below about ⅓ $H_2S/CO_2$, but it also concerns gas streams containing higher proportions of hydrogen sulfide.

It is well known by those skilled in the art that concentrated $H_2S$ may be converted to sulfur by air oxidation in what is known as the Claus reaction. This can be summed up as:

$$H_2S + \tfrac{1}{2}O_2 \rightarrow S + H_2O \qquad (1)$$

Unless the $H_2S$ is very concentrated, i.e., > 40 mol %, the reaction is usually carried out in two steps:

$$H_2S + 3/2\ O_2 \rightarrow H_2O + SO_2 \qquad (2)$$

$$2H_2S + SO_2 \rightleftharpoons 2H_2O + 3S \qquad (3)$$

In practice, one-third of the $H_2S$ containing stream is oxidized with air as in Equation (2), which step also dilutes the stream with nitrogen. The combustion product is then recombined with the other two-thirds of the $H_2S$ containing stream, and Reaction (3) is carried out at about 400°–600° F. over a catalyst. Because the reaction is reversible, the accumulation of sulfur vapor and water vapor prevents complete conversion, and the gas stream must be cooled to about 300° F to condense out the sulfur as a liquid. The stream can then be reheated for further reaction in an additional catalyst bed or stage. Two or even three stages are commonly used. Because the water vapor is not condensed, and because the concentrations of reactants are decreased at each stage, the degree of reaction also diminishes at each stage, so that it becomes impractical to use more than three stages. Indeed, the bulk of the yield, 60-85%, is obtained in the first stage. If one starts with a pure $H_2S$ stream, about 97.5% conversion can be obtained with three stages.

When the hydrogen sulfide feed is dilute, as for example with $CO_2$, $N_2$, or other inert ingredients, there are four fundamental problems. Firstly, the possible yield is reduced to perhaps <90%. Secondly, the sizes of the sulfur reactors and condensers must be increased inversely to the $H_2S$ concentration, a severe economic handicap. Thirdly, the cost of reheating the stream between stages becomes an additional burden, and fourthly, if the $H_2S$ is too dilute (i.e., less than about 25-40 volume %), fuel must be added to the ⅓ portion of the stream which is to be combusted by Reaction (2). This fuel requires additional air, and its combustion products along with the included $N_2$ add to the inert gas load to the reactor. Further, the water from the combustion of the fuel acts to drive Reaction (3) in the reverse direction, and overall yields are substantially reduced. The alternative to adding fuel is to burn sulfur as a source of $SO_2$, but this is difficult, expensive and obviously reduces the product yield by the sulfur so burned.

As a consequence of the above, streams with low $H_2S$ concentrations, e.g., 2-20 vol. %, cannot be economically converted to sulfur via the Claus process. Further, if the Claus process is used (in spite of high costs), the yield is substantially less than 90-%, and the tail gases from the process invariably need additional treatment. The paucity of economical treating techniques has led to a very unfavorable environmental-economical situation in many industries, e.g., natural gas, where dilute $H_2S$ streams are a by-product of the operation.

The present invention provides a solution to these problems by providing a system whereby only a single Claus stage is necessary and the costs of multiple units are avoided as are the costs of reheating between Claus stages. The present invention is useful in recovering sulfur from gases containing $H_2S$ in substantially any amount, that is, there is no lower limit or upper limit of $H_2S$ content for gases that can be treated by this invention. However, the invention is most useful and currently most economical when applied to gases containing about 1 to about 20 vol. %.

The system of the present invention, furthermore, is self-balancing to a greater extent than heretofore known processes and requires fewer and less frequent adjustments of feed rates to the several units in the process and/or of operating conditions thereof. The present invention greatly lessens the effects on sulfur dioxide recovery (and hence the sulfur product) by the build-up of heat stable salts in the sulfur dioxide absorbent and further contributes to the self-balancing features of the process of the present invention.

Another advantage of the above scheme is the ability to handle streams containing considerable quantities of COS and/or $CS_2$. These usually pass through a further treatment regardless of the Claus efficiency. Few schemes for tail gas treatment are able to handle these sulfur impurities. In the present invention, these compounds are incinerated to $SO_2$, and are harmlessly recycled back to the Claus reactor.

In carrying out the process of this invention the $H_2S$-containing feed gas stream is joined by an $SO_2$ stream and passes into a Claus reactor wherein a portion of the sulfur compounds, e.g., 67%, are reacted according to above Equation (3) to give sulfur. The product gas stream passes into a condenser, where the elemental sulfur is condensed out as a liquid stream. The gas from the condenser is passed into an incinerator, where it is mixed with fuel, if necessary, and sufficient air for combustion. The gaseous combustion products, in which the sulfur compounds have all been oxidized to $SO_2$, are led to the $SO_2$ removal cycle, in which substantially all the $SO_2$ is removed, the quantity leaving the process in the effluent stream representing less than 2% of the sulfur introduced as $H_2S$ in the feed stream. The $SO_2$ recovered in the $SO_2$ removal cycle is passed to join the feed stream entering the Claus reactor.

If the yield in the reactor is about 67%, then the amount of gaseous sulfur compounds leaving the sulfur condenser will be sufficient to provide the stoichiometric quantity of $SO_2$ necessary to react with the $H_2S$ in the feed stream in the Claus reactor. Should the yield of the reactor fall below this value, i.e., 67%, the gaseous sulfur compounds leaving the sulfur condenser and hence the recycled $SO_2$, will exceed the stoichiometric quantity, and the excess $SO_2$ will drive the Claus reaction to increased yields. In addition, much or all of the water of combustion, Equation (2), can be removed in the $SO_2$ removal cycle and this reduced water content will help drive the reaction of Equation (3), to higher yields than would otherwise be obtainable so that overall yields of elemental sulfur of the process of this invention can be maintained at 98% and better.

Should the yield in the Claus reactor increase above 67%, then the gaseous sulfur compounds leaving the sulfur condenser will be insufficient to provide the stoichiometric quantity of $SO_2$, and the reduced circulating quantity of $SO_2$ will retard the reaction to again maintain the same high overall yields of sulfur, about 67% per pass through the reactor and greater than 98% total. In this sense the process of this invention is self-balancing.

In order, however, to take economic advantage of a potential efficiency in the Claus reactor of greater than 67% yield, it may be preferable to pass a stream of $H_2S$-containing feed gas directly to the incinerator in order to maintain a sufficient quantity of circulating $SO_2$. Within the limit of 100% Claus reaction efficiency, this could be 33% of the feed gas, but practically it would be 5-25% for a reactor of 70-90% efficiency. During start-up, when no $SO_2$ is available, it will be desirable to send at least 33% of the feed gas, and perhaps all of the feed gas at first, to the incinerator until sufficient $SO_2$ is produced for circulation.

The gaseous output of the incinerator is moved to an $SO_2$-absorber where it is contacted with an aqueous absorbent solution such as an alkanolamine or a sulfite thereof as described in U.S. Pat. Nos. 3,904,735 incorporated herein by reference and 3,620,674 with sodium, potassium or ammonium hydroxide (e.g., aqueous ammonia) or sulfite. The $SO_2$ is absorbed from the incinerator tail gas which is then released through a stack or otherwise disposed of. The aqueous absorbent solution becomes rich in $SO_2$ and is passed to a stripper where the absorbed $SO_2$ is released by heating thus providing a lean absorbent solution which is recycled back to the absorber for contact with additional incinerator tail gas. Suitable absorption-stripping cycles are disclosed in detail in concurrently filed patent applications Ser. No. 781,175, entitled "Improved Process For Removing $SO_2$ From Effluent Gases And For Removing Heat Stable Salts From Systems In Which They Accumulate" by D. A. Dunnery, J. E. Sokolik, G. R. Atwood and A. J. Kosseim, and Ser. No. 781,166, entitled "Improved Process For Removing $SO_2$ From Effluent Gases And For Removing Heat Stable Salts From Systems In Which They Accumulate Using An Anion Exchange Resin" by J. A. Kosseim, D. A. Dunnery, and G. R. Atwood. The disclosures of both of these applications are incorporated herein by reference.

It is important to use those operating conditions in the absorption-stripping cycle that restrain $SO_2$ oxidation, $SO_2$ disproportionation, and solvent degradation. These include, for example, limiting the temperature of absorption and stripping to 125° C or less and maintaining in the absorbent at least one mol of water for every mol of $SO_2$ absorbed. It is recognized, too, that even under such constraints there could be some $SO_2$ oxidation to produce the heat stable sulfate ion. In addition, it is realized that some $SO_3$ exists in the incinerator tail gas as such, and would be simultaneously absorbed along with the $SO_2$ to give additional sulfate ion. It has been previously proposed to remove the sulfate ion by potassium ion precipitation (see U.S. Pat. No. 3,904,735). Whereas this is an excellent step in the situation wherein the major heat stable salt is the sulfate (as it would certainly be if the process were used to treat sulfuric acid tail gas containing large quantities of $SO_3$), in many other circumstances this is not the case. The effective choice of absorbent and operating conditions reduces oxidation to very low levels and, if there is little $SO_3$ in the incoming gas, sulfate is no longer the major heat stable anion. Instead, the products of $SO_2$ disproportionation and other side reactions make up the bulk of the heat stable anions and these include thiosulfate, dithionate, trithionate and other species. The previously proposed alkali metal precipitation techniques are not sufficiently effective against these other heat stable salts. Unless removed the heat stable salts build up to the point where the absorbent no longer functions efficiently and ultimately becomes incapable of absorbing sulfur dioxide.

The absorption-stripping cycle used in this invention relates to the removal of divalent sulfur oxyanions of heat stable salts which accumulate in the aqueous absorbent solution, and comprises the step of contacting a small portion of the lean aqueous absorbent solution as a slip or purge stream with an anion exchange resin having anions displaceable by the divalent sulfur oxyanions of the heat stable salts to remove same from the lean aqueous absorbent solution whereby the anions of the resin are replaced by the divalent sulfur oxyanions of the heat stable salts. The heat stable salts (collectively designed HSS) exist in the absorbent primarily in the dinegative anionic forms $SO_4^=$, $S_2O_3^=$, $S_2O_6^{50}$, etc., collectively designated as $HSS^=$. The anions of the anion exchange resin are able to be displaced by heat stable divalent sulfur oxyanions in the lean aqueous absorbent solution which thus becomes bonded to the resin. The anion exchange resin is used to treat the lean aqueous absorbent to avoid as much as possible the useless consumption of ion exchange capacity. This permits the more selective removal of heat stable salt anions with as little waste as possible of ion exchange capacity and regenerant costs on needless aqueous sulfur dioxide or bisulfite ion removal.

Commercial anion exchange resins are available in two major types, macroreticular and "gel" type. The macroreticular resins are small, tough, rigid plastic beads having large discrete pores in the range of 1300 A. Because of their large uniform pore structure, these resins are useful for the absorption and elution of high molecular weight ions and have good hydraulic characteristics. Furthermore, because of their tough structure (they have a higher degree of crosslinking), they are less susceptible to physical attrition and have a long operating life. They do, however, have somewhat lower capacity than the "gel" resins. The latter do not contain any true porosity (and usually have a much lower degree of crosslinking) and the ions to be exchanged must "diffuse" through the gel structure, thus limiting the size of the ions that can be handled. The advantage of this type of resin is its higher exchange capacity and somewhat lower capital cost.

Both of these two major types are broken down into two sub-groups: The strongly basic anion exchangers with quaternary ammonium functionality and the weakly basic anion exchangers with polyamine functionality. The strong base resins offer much better removal of anions in the exhaustion step whereas the weak base resins offer greater ease of regeneration.

Suitable anion exchange resins for use in this invention include the strong base and weak base anion exchange resins capable of containing anions, such as hydroxyl or bisulfite anions, displaceable by $HSS^=$. Preferred anion exchange resins are the styrene-divinylbenzene copolymers, or the epoxy-amine resins, usually in bead form. The strong base exchangers have quaternary ammonium functionality and are preferred in some instances. The weak base exchangers have polyamine functionality and are preferred in other instances. Macroreticular strong base anion exchange resins, which are especially preferred, are commercially available, for example from Rohm and Haas as Amberlite IRA-900, IRA-900C, IRA-904, IRA-910, IRA-911, and IRA-938. Gel-type strong base ion exchangers that can be used include Rohm and Haas' Amberlites IRA-400, IRA-400C, IRA-401S, IRA-402, IRA-410, IRA-425 and IRA-458 and Stratabed 402.

The weak base anion exchangers, i.e., those having polyamine functionality can also be used and these include Rohm and Haas' macroreticular Amberlite IRA-93 and Stratabed 93 and Dow Chemical Company's Dowex 3 and Dowex WGR. Gel-type weak base anion exchange resins, which can be used herein, are also commercially available from Rohm and Haas as Amberlites IR-45, IR-47 and IR-68 and are also available from Dow. Any of the weak base or strong base anion exchange resins described in "Ion Exchange Technology", F. C. Nachod and J. Schubert, Editors, Academic Press, New York, 1956, and "Ion Exchange Resins", Robert Kunin, Robert E. Krieger Publishing Company, Huntington, N.Y., 1972, can be used.

In summary, the operation of a strong base ion exchange resin bed to remove $HSS^=$ from the absorbent solution typically consists of the following steps when the ion exchange resin has displaceable hydroxyl anions: (1) Backwashing, (2) Regeneration, and (3) Exhaustion, which are preferably used in this invention.

1. Backwashing — This is accomplished by reversing the flow of liquid (usually water) through the column. This step rinses out any sediment trapped among the resin beads and it allows the beads to re-settle, thus alleviating any pressure built up in the column due to expansion and contraction of the resin.

2. Regeneration — The regeneration is simply a reverse shift in the reaction equilibrium due to the passage of a suitable concentrated ionic specie through the resin. As an example, assume the resin is in the heat stable salt form, represented by $(R^+)_2HSS^=$, and it is being regenerated to the hydroxyl form, $R^+OH^-$, with a concentrated caustic solution. This can be represented by the following equilibrium reaction:

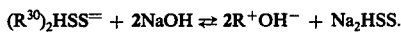

$$(R^{30})_2HSS^= + 2NaOH \rightleftarrows 2R^+OH^- + Na_2HSS.$$

3. Exhaustion — This is the part of the cycle where the unwanted anions, such as $HSS^=$, are removed from the solution and replaced with acceptable anions from the resin. In the case of triethanolamine (TEA) solvent system, this can be represented as follows:

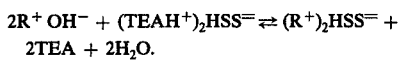

$$2R^+OH^- + (TEAH^+)_2HSS^= \rightleftarrows (R^+)_2HSS^= + 2TEA + 2H_2O.$$

A rinse step is used to wash the excess regenerant (e.g., NaOH, ammonium hydroxide or other inorganic hydroxide) from the resin after the regeneration step. This usually requires large quantities of water which are disposed of by appropriate means as described hereinafter. A rinse step is also used after the exhaustion step to minimize loss of absorbent which is recovered in the rinse waters.

In the case of a weak base ion exchange resin having bisulfite anions, the operation typically includes the above-mentioned steps used with the strong base resin and, in addition, uses a further step in the regeneration step 2. After the resin in the $HSS^=$ form has been converted to the hydroxyl form, the hydroxyl form is converted to the bisulfite form by reaction with aqueous SO$_2$, i.e., HSO$_3^-$ ions as represented by the formula:

$$R^+OH^- + H_2SO_3 \rightleftarrows R^+HSO_3^- + H_2O$$

Also, a rinse step is used after the aqueous SO$_2$ treatment to wash from the resin excess aqueous SO$_2$ and waste material.

A single bed of column of anion exchanger or a plurality of beds or columns thereof can be used. Each bed, or course, must be taken out of service periodically for regeneration. If one bed is used, the purge stream is continuously removed and stored while reclaimed absorbent (reclaimed by previous anion exchange resin treatment) is fed back into the system as make-up. Periodically, for example once a day, the stored purge stream is reclaimed and the reclaimed absorbent is stored and gradually fed back into the system to continuously make up for the purge stream continuously removed. After the stored purge stream has been reclaimed by anion exchange treatment there remains ample time for the regeneration of the bed before the next reclamation operation.

For continuous anion exchange operation, it is necessary to have at least two anion exchange resins beds, one or more in anion exchange operation reclaiming absorbent while one other is being regenerated.

The ion exchange resin beds or columns are operated under the best conditions for ion exchange. Ambient temperatures and pressures are usually acceptable, for example, room temperature and existing pressure of the atmosphere can be used. The fluids coming into contact with the beds or columns can be preheated or precooled as desired or necessary to provide the desired contact temperatures.

It is important that the absorbent purge stream and wash, rinse and regeneration fluids passed through the anion exchange resin bed or column be of sufficiently low density and viscosity so as not to float off the resin or otherwise disrupt the bed. The densities and viscosities of fluids coming into contact with the bed can be lowered by dilution with water. For example, the incoming absorbent purge stream if of too high a density or viscosity can be diluted with water, for example, the wash water obtained by washing the bed or column with water after contact with the absorbent purge stream. Usually the density of the purge stream, regenerant and wash waters should be kept below 1.05 g/cc which is below the normal density of the anion exchange resins.

Since each stream that is passed through the ion exchange bed is preferably followed by a water wash step to prevent cross contamination of process streams, there is a substantial quantity of more or less contaminated waste streams. However, this difficulty is readily overcome. For instance, in regenerating the exhausted resin bed with sodium hydroxide there is first displaced a free column volume of virtually pure water which can be returned to the water reservoir or used elsewhere in the process. The tail cut from the caustic stream contains almost pure aqueous sodium hydroxide (with traces of bisulfite and heat stable salts) and can be returned to the sodium hydroxide reservoir in which extraneous salts reach a small and wholly innocuous steady state concentration. The absorbent stream containing heat stable salts again displaces a column volume of virtually pure water which again is returned to the water reservoir for subsequent resin washing or otherwise employed in the process. The remainder of the absorbent stream, now depleted in heat stable salts, is returned to the absorption-stripping cycle of the process.

In regenerating an exhausted resin bed (after water-washing) with excess ammonia, the ammonia stream first displaces a free column volume of substantially uncontaminated water which can be returned to the water reservoir or used elsewhere in the process. The tail cut from the ammonia stream contains substantially uncontaminated aqueous ammonia (with traces of bisulfite and heat stable salts). Because of the enormous affinity of the resin for hydroxyl ion, these extraneous salts in the ammonia tail cut can be returned to the ammonia reservoir in which extraneous salts reach a small and innocuous steady state concentration. Likewise, when the aqueous sulfur dioxide solution is passed through the resin bed in the hydroxyl form, the first effluent is substantially uncontaminated water which can be reused subsequently for washing the resin or elsewhere in the process. The tail cut contains water and sulfur dioxide which can be returned to the sulfur dioxide reservoir for subsequent use in regenerating the resin. The absorbent stream containing heat stable salts again displaces a column volume of substantially uncontaminated water which again is returned to the water reservoir for subsequent resin washing or otherwise employed in the process. The remainder of the absorbent stream, now depleted in heat stable salts, is returned to the absorption-stripping cycle of the process.

The volume fraction of the circulating absorbent (in the absorption-stripping cycle) which is diverted to the absorbent reclamation step is directly proportional to the rate of heat stable salt generation and absorption in the circulating absorbent and inversely proportional to a) the desired ratio of heat stable salts to active absorbent tolerable or acceptable in the circulating absorbent and b) to the fraction of the heat stable salts present in the slip stream which is removed for reclamation. The volume fraction of the circulating absorbent diverted as the slip or purge stream to the absorbent reclamation step (i.e., into contact with the anion exchange resin) is about 2 to about 20 volume percent, preferably about 5 to about 8 volume percent, and can be more or less depending upon particular conditions. It is preferred to maintain the volume fraction of curculating absorbent diverted as the slip or purge stream as low as possible to minimize absorbent losses in the wash water of the resin regeneration step not recirculated to the purge stream from density adjustment. It is desirable, of course, to conduct the overall process in such a manner that heat stable salt formation and accumulation is minimized.

It is preferred to remove for reclamation a purge stream from the lean absorbent stream on its way from the stripper to the absorber because it is desirable to use the capacity of the ion exchange resin for picking up the heat stable salt content of the purge stream and not the sulfur dioxide content of the purge stream.

In some instances, as in the use of weak base anion exchange resins in the bisulfite form, the resin more selectively picks up the HSS[50] anions than bisulfite anions. In such cases, it is preferred to remove for reclamation a purge stream from the rich absorbent stream on its way from the absorber to the stripper. The resin's capacity for selectively picking up the heat stable salt content of the lean purge stream is slightly hampered by the sulfur dioxide content which is primarily in the form of sulfite ions in the lean purge stream in which case the divalent sulfite ions compete to a certain extent with the divalent heat stable salt anions. Nevertheless, the absorbent purge stream removed for reclamation can be taken from the lean absorbent leg or the rich absorbent leg of the absorption-stripping cycle whichever is most convenient or otherwise most advantageous. A particularly advantageous procedure in some instances is to take a purge stream of the rich absorbent coming from the absorber and to contact it with incoming waste gas before sending it to the ion exchange resin. In this way the incoming incinerator tail gas is quenched to a more desirable absorption temperature and humidified or dehumidified to the desired moisture content while the absorbent purge stream picks up sulfur trioxide and acid mist from the tail gas to reduce the formation and accumulation of heat stable salts in the absorption-stripping cycle and, at the same time, gives up some of its sulfur dioxide content to the tail gas for removal and concentration in the absorption-stripping cycle.

Specifically, the waste stream produced by treating the exhausted anion exchange resin (loaded with heat stable anions) with inorganic hydroxide contains the heat stable salt anions, water, some inorganic cations (e.g. $Na^{30}$) and some $SO_2$. It may be preferred to recover the water and ammonia, if present, and, at the same time, to further concentrate the waste stream containing the $HSS^{50}$ to simplify disposal thereof.

This can be accomplished by contacting the incoming waste gas with the waste stream whereupon sulfur trioxide and acid mist are absorbed in the waste stream and $SO_2$ is displaced to the waste gas. While the disposal of heat stable salts in the waste stream represents a slight loss in sulfur recovery, the reduction of sulfur emissions, usually the major objective, is readily accomplished.

It is also preferred for ease of stripping to increase residence time of the rich absorbent in the absorbent stripper as much as practical. However, inasmuch as the increase of residence time also increases heat stable salt formation, the residence time should not be increased to such an extent that excessive amounts of $HSS^{50}$ are formed. This can be done in a number of ways one of which is to size the stripper boiler or evaporator to provide a high holdup to throughput ratio. Another way of increasing residence time is to use conventionally sized equipment and to recirculate the absorbent being stripped through an external circulation loop containing an amply sized reservoir so that the total holdup time in the stripper and its circulation loop is adequate to provide the desired high residence time.

It also has been found that with an 80–90° C stripping temperature, the quantity of $SO_2$ disproportionation products produced is reduced to only a fraction of that produced at 100–125° C stripping and, accordingly, the lower stripping temperature puts less load on the ion exchange resin. For this reason, it is preferred that the stripping temperature should not exceed 100° C.

The techniques and procedures described in the above-identified concurrently filed patent applications can be employed in the process of this invention and the disclosure of said applications are incorporated herein by reference.

There are many variations of the steps of the process described above which do not change the essential nature of the invention described and claimed herein. One such variation would be to introduce the bulk of the stripped absorbent from the stripper into the absorber at one stage below the top and to introduce the reclaimed portion of absorbent coming from the ion exchange resin step to the top stage of the absorber. In this way, the reclaimed absorbent, which is much leaner than the stripped absorbent, would be able to more effectively remove $SO_2$ at the small concentrations existing in the waste gas at the top of the absorber, permitting a more efficient clean-up of the gas.

DESCRIPTION OF SPECIFIC EMBODIMENTS

Figure 1:
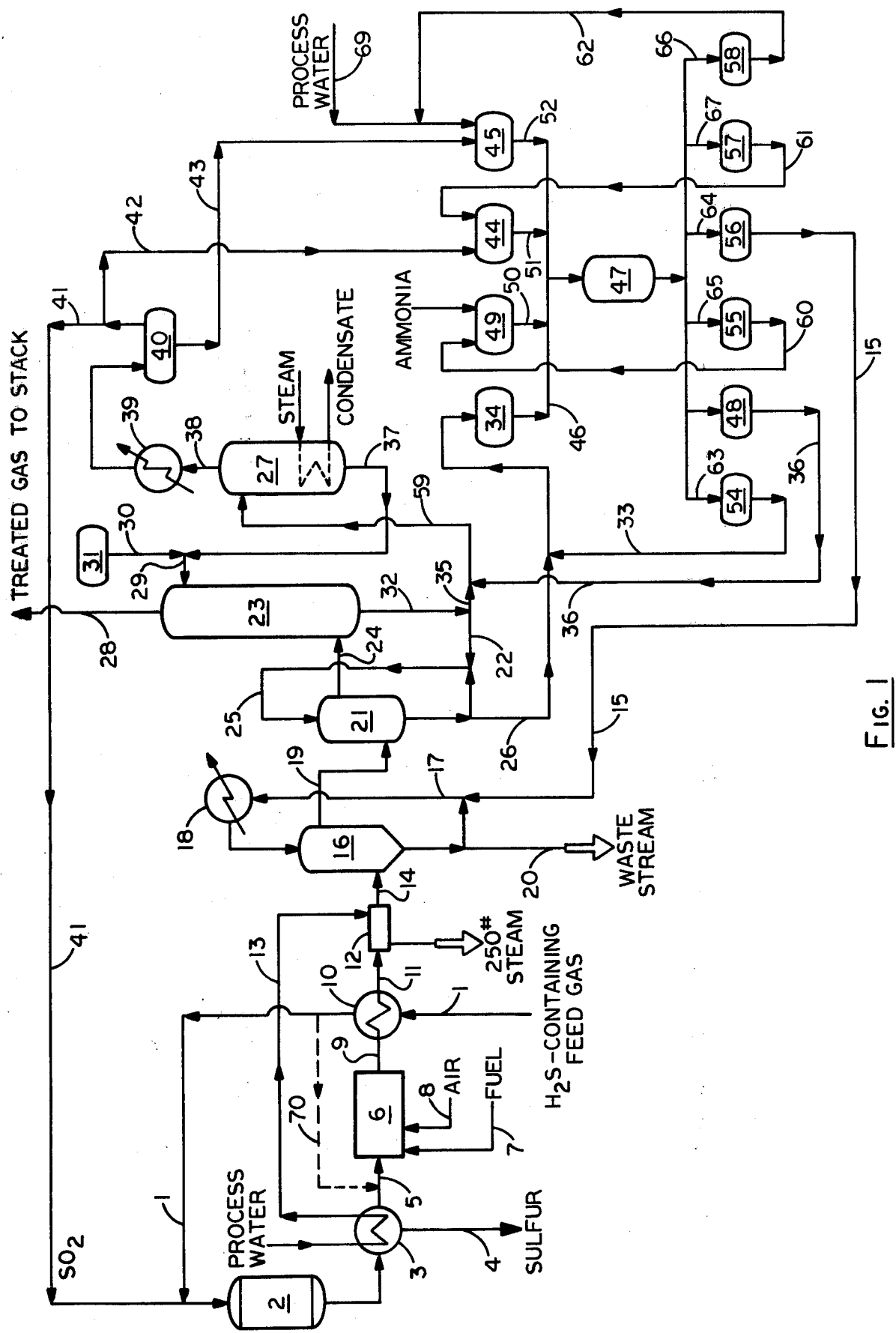
FIG. 1 is a flow diagram illustrating one embodiment of this invention utilizing a weak base anion exchange resin.

The present invention comprises several steps directed toward the economical removal, and recovery as sulfur, of hydrogen sulfide from gases containing same. A primary objective is to remove sulfur compounds from the gases to avoid pollution problems and undesirable effects on catalysts when the gases are subsequently treated therewith. The invention also provides for a steady supply of sulfur dioxide for reaction with the hydrogen sulfide to produce sulfur therefrom. It is to be understood that one or more of the steps of the embodiments of this invention given hereinafter may be altered or deleted depending upon the temperature, pressure and composition of the feed gas; specific requirements the process must meet; the relative costs of steam, chemicals and capital investment, and other factors. In a full embodiment, the invention comprises the steps of:

(a) The hydrogen sulfide-containing gas is combined with sulfur dioxide gas (about 0.3 to about 0.9, preferably about 0.35 to about 0.4, # moles of $SO_2$ per # mole of $H_2S$) and contacted at a temperature of about 400° F to about 550° F in a Claus reactor with a suitable catalyst such as activated alumina to react the $H_2S$ and $SO_2$ to form sulfur.

(b) The sulfur in the effluent gas from the Claus reactor is condensed at a temperature of about 250° F to about 350° F.

(c) The effluent gas from the condenser is incinerated at a temperature of about 1700° to about 2100° F to burn the $H_2S$ and other combustible sulfur containing gases such as COS and $CS_2$ to produce additional $SO_2$.

(d) The sulfur dioxide in the tail gas from the incinerator is absorbed in an absorbent, preferentially aqueous alkanolamine to form a rich absorbent enriched in $SO_2$ content, such absorption being carried out at about 20 to about 70° C temperature. The lower temperatures increase absorption efficiency and decrease $HSS^=$ formation in the absorber. The aqueous absorbent solution can contain about 5 to about 50, preferably about 10 to about 40 wt. % water. Higher and lower amounts of water can be used.

(e) The mainstream of the rich absorbent is steam stripped in a single or multiple stage still or evaporator providing a liquid residence time of about 3 to about 30 minutes, preferably about 10 to about 15 minutes and operated at a reduced pressure of about 50 to about 350 mm Hg, preferably about 100 to about 150 mm Hg and a temperature of about 80 to about 100° C. The lower temperatures decrease $HSS^=$ formation in the stripper.

(f) The sulfur dioxide removed in the preceding step (e) is recirculated to step (a) for reaction with more hydrogen sulfide in the feed gas in the Claus reaction.

(g) The mainstream of lean aqueous absorbent solution formed in the stripping zone is recycled from the stripping zone of step (e) to step (d) and re-contacted with the incinerator tail gas.

(h) A portion of the absorbent, containing divalent sulfur oxyanions of heat stable salts which accumulate in said aqueous absorbent solution, is separated as a purge stream from one of the mainstreams. The portion separated is in the amount of about 2 to about 20 wt. %, preferably about 5 to about 10 wt. % of the mainstream.

(i) The purge stream is contacted with an anion exchange resin having anions displaceable by the divalent sulfur oxyanions of heat stable salts to remove same from the purge stream whereby the anions of the resin are replaced by said divalent sulfur oxyanions of heat stable salts.

(j) After contact with the anion exchange resin the purge stream is returned to one of the mainstreams. In the process the anion exchange resin is regenerated by contacting it with an aqueous inorganic hydroxide to replace the divalent sulfur oxyanions of heat stable salts on said resin with hydroxyl anions thereby forming a waste stream containing said divalent sulfur oxyanions of heat stable salts which can be readily disposed of in any suitable manner.

The following examples are presented. In the examples, the following designations have the meaning given below:

cc; cubic centimeter
g; grams
vol. %; volume percent
ppm; parts per million based on weight
ppmv; parts per million based on volume
M lb mols; thousand pound mols
LTPD; long tons per day
M. Wt.; molecular weight
M; Molar
meq; milliequivalent
ml; milliliter
MSCFD; thousand standard cubic feet per day
psia; pounds per square inch absolute
psig; pounds per square inch gauge
TEA; triethanolamine
HSS; heat stable salts having divalent sulfur oxyanions, e.g., $SO_4^=$, $S_2O_3^=$, $S_xO_6^=$ and the like, as described hereinabove.

Also, unless otherwise specified all parts and percentages are on a molar basis or their equivalent in volume, and all temperatures are on the Fahrenheit scale.

EXAMPLE 1

Referring to FIG. 1, 100 MSCFD of gas containing 15 vol.% $H_2S$, 6 vol.% $H_2O$, traces of COS and $CS_2$, balance $CO_2$, enter through line 1 and are combined with 5.2 MSCFD of $SO_2$ in a single stage Claus reactor 2 containing activated alumina catalyst at a temperature of 450° F. Reaction occurs to give a 65% yield of sulfur based on $H_2S$ which is condensed out in condenser 3 and withdrawn via line 4. The reactor tail gases contain 5.3 MSCFD $H_2S$, 0.3 MSCFD $SO_2$, 17 MSCFD $H_2O$, and 79 MSCFD $CO_2$, with traces of the minor constituents (COS, $CS_2$ etc.) and are moved through line 5 to incinerator 6. This reactor tail gas does not contain sufficient $H_2S$ to support combustion, so it is combined in the incinerator 6 with 10.5 MSCFD methane (via pipe 7) and 181 MSCFD air (via pipe 8). The result is approximately 290 MSCFD flue gas containing 5.6 MSCFD $SO_2$, 90 MSCFD $CO_2$, 145 MSCFD $N_2$, 7.2 MSCFD excess $O_2$ and 43.3 MSCFD $H_2O$ and having a temperature of 1900° F.

The incinerator tail gas passes through line 9 through a heat exchanger 10 where it heats incoming $H_2S$-containing feed gas and from whence it passes through line 11 to reboiler 12 which converts the process water, previously used to condense the sulfur and passed via line 13 to said reboiler, into 250 psig steam. The incinerator tail gas or flue gas leaves the reboiler 12 in stream 14.

Stream 14 can be depleted of most of its $SO_3$/acid mist content, if any, and conditioned to the desired dew point and absorption column temperature by circulating the waste stream 15 from the ion exchange resin bed to be described hereinafter through quench tower 16. The wast stream 15 is recirculated as stream 17 through cooler 18 and reintroduced to the top of quench tower 16 as the quench media. The gas stream 19 exiting tower 16 is now at about 120° F temperature and contains approximately 6.0 vol. % $H_2O$ and 80 ppm $SO_3$/acid mist. Simultaneous with cooling and humidifying (or drying) the gas, the latter has also been somewhat depleted of $SO_3$/sulfuric acid mist. There are many advantages to using waste stream 15, instead of process water, in the quench tower 16: (a) the overall water requirement for the process is thereby reduced, (b) ammonia, if any, present in waste stream 15 enhances the removal of $SO_3$ from the gas stream 14 and neutralizes it, and (c) waste stream 20 which exits the quench tower 16 is now at a higher temperature and has a smaller volume than the inlet waste stream 15.

The cool gas stream 19 enters the base of a second quench tower 21, wherein it flows countercurrently to a purge stream 22 containing TEA from the bottom of an absorber tower 23. Purge stream 22 further reduces the $SO_3$/acid mist content of the gas stream to almost nil before it enters as stream 24 into the base of the absorber tower 23. The purge stream 22 is recirculated as a stream 25 through quench tower 21, wherein its HSS= content increases from about 0.26/1 to 0.40/1 of TEA tied up with HSS=/total TEA in the stream on a weight basis; and it simultaneously releases part of its $SO_2$ content to the gas stream 24. Among the many advantages of this step are: (a) increasing the HSS= level in the purge stream 26 emanating from the loop of the second quench tower 21, to be treated by the ion exchange treatment described hereinafter, which results in a higher chemical efficiency and thus reduces costs, and (b) a smaller volume of recirculating solvent are required between the absorber 23 and sulfur dioxide stripper 27 as described hereinafter which results in smaller equipment size and reduced costs.

The pretreated gas stream 24 enters the base of the absorber 23 wherein it flows countercurrent to the downcoming TEA and its $SO_2$ content is reduced from about 21000 ppm to about 200 ppm (more or less as is required to meet pollution restrictions). The $SO_2$-depleted gas exits as stream 28 from the top of the absorber 23 and is sent to the stack with or without an intermediate reheating step as may be desired. Lean TEA absorbent stream 29, which has been cooled to approximately 120° F and to which any necessary make-up solvent has been added via line 30 from TEA make-up tank 31 is fed into the top of the absorber 23. It passes downward, countercurrent to the gas stream, during which time it picks up $SO_2$, increasing its loading from about 0.2 to about 0.8 mol $SO_2$ per mol of triethanolamine sulfite.

The rich TEA absorbent stream 32 which exits the bottom of the absorber 23 is divided into two streams. One stream 22 circulates to the second quench tower 21 and, after being enriched with $SO_3$/acid mist, it emanates from quench tower 21 as purge stream 26 which is diluted with water to the desired density (suitable for contacting the anion exchange resin bed described hereinafter) with a portion of absorbent wash stream 33 to be described hereinafter and is sent to purge absorbent reservoir 34 for reclaiming with respect to $HSS^=$. The second stream 35 is joined by regenerated absorbent cycle stream 36 and enters the $SO_2$ stripper 27 which is a thin-film evaporator where water and $SO_2$ are evaporated at 100 mm Hg and 90° C in a ratio of approximately 7 lbs $H_2O$ per lb $SO_2$. The lean absorbent 37 which exits the stripper 27 is sent back to the absorber 23 top after being heat exchanged and cooled (not shown) to the desired absorption temperature.

The $H_2O/SO_2$ overhead stream 38 from the $SO_2$ stripper 27 passes through condenser 39 and thence into separator 40 from which the $SO_2$ stream 41 can be pumped back to the Claus reactor where it combines with $H_2S$ to form sulfur. A slip stream 42 of $SO_2$ and a water condensate stream 43 are sent respectively to the sulfurous acid reservoir 44 and to the water reservoir 45 where they are used in the reclaiming step described hereinafter.

A purge absorbent stream from purge absorbent reservoir 34 is filtered to remove any fly ash which may have by-passed initial mechanical removal and been entrapped in the absorbent. The filtrate is then passed via line 46 through one or more anion exchange beds 47 containing weak base anion exchange resins such as Rohm and Haas IRA-93 remove about 40% of the HSS anions from the absorbent, replacing them with an equivalent amount of bisulfite anions from the resin. The regenerated absorbent, now depleted in HSS and diluted with water, is passed into reservoir 48 from which it is returned as regenerated absorbent stream 36 to the $SO_2$ stripper 27, to provide additional stripping water, after being mixed with the rich solvent stream 35.

While one or more anion exchange beds 47 are being used for absorbent reclaiming, others are being regenerated by a two-step process which consists of (1) treatment with 2-10 molar aqueous ammonia solution from reservoir 49, via stream 50, to convert the resin to the hydroxyl form, and (2) treatment with aqueous sulfur dioxide from reservoir 44, via stream 51 to convert the resin from the hydroxyl form to the bisulfite form. After contact of the anion exchange beds with each of the three streams, aqueous absorbent purge stream 46, aqueous ammonia stream 50 and aqueous sulfur dioxide stream 51, a water-wash step is used to minimize contamination of individual process streams. The total wash water requirement is provided by stream 52 emanating from water reservoir 45.

The effluents from the ion exchange beds 47 are cut in such a way as to minimize cross-contamination of the respective streams and are sent to appropriate tanks comprising absorbent wash water tank 54, regenerated absorbent tank 48, aqueous ammonia tank 55, waste water tank 56, aqueous sulfur dioxide tank 57 and recycle water tank 58. The absorbent wash water stream 33 is returned to the process as a source of make-up water, where the bulk of it is mixed with stream 26 to dilute it to the proper density suitable for contacting the anion exchange resin beds 47, while the remaining portion of stream 33 is returned to the water reservoir 45. the regenerated absorbent stream 36 is returned to the stripper 27 via line 59. The aqueous ammonia stream 60, which contains small amounts of bisulfite and HSS, is returned to the ammonia reservoir 49. Likewise, the essentially pure aqueous sulfur dioxide stream 61 and process water stream 62 are returned to reservoirs 44 and 45, respectively.

More specifically, the wash water effluent following contact of the anion exchange beds 47 with absorbent purge stream 46 is diverted via line 63 to regenerated absorbent wash tank 54 which supplies absorbent wash stream 33 used for the dilution purposes mentioned hereinabove. The effluent richest in heat stable salts resulting from treatment with aqueous ammonia (stream 50) is sent via line 64 to waste water tank 56 which supplies waste stream 15. The effluent poorest in $HSS^=$ and richest in ammonia resulting from treatment with aqueous ammonia (stream 50) is sent via line 65 to ammonia wash tank 55 from whence it is returned as needed to aqueous ammonia reservoir 49 via line 60. The wash water effluent richest in ammonia resulting from washing after aqueous ammonia treatment is also sent to ammonia wash tank 55 and wash water effluent poorest in ammonia is sent via line 66 to recycle water tank 58 for recycling via line 62 to water reservoir 45. The effluent poorest in sulfur dioxide resulting from the initial stages of treatment with aqueous sulfur dioxide is sent to recycle water tank 58 and the effluent richest in sulfur dioxide is sent via line 67 to sulfurous acid wash tank 57 for recycle to sulfurous acid reservoir 44 via line 61. The wash water effluent richest in sulfur dioxide resulting from washing after aqueous sulfur dioxide treatment is sent to sulfurous acid wash tank 51 and effluent poorest in sulfur dioxide is sent to recycle water tank 58. Make-up ammonia is added through line 68 and make-up process water is added through line 69.

The aqueous waste stream effluent 15 which contains the heat stable anions removed from the absorbent, along with ammonia and sulfur dioxide, is sent to the quench tower 16 as previously described. The effluent 20 from tower 16 is a waste stream containing most of the $SO_3$/acid mist and the $HSS^=$, along with some bisulfite and ammonia, and leaves the system as the bottom product.

The resulting effluent stream 28 comprises 241 MSCFD (water eliminated) with only 200 ppm $SO_2$, which $SO_2$ amounts to <0.05 MSCFD or 0.3% of the $H_2S$ in the feed stream 1. Thus, the process of this Example removes 99.7% of the original sulfur. Of the $SO_2$ so removed, approximately 0.33 MSCFD is disposed of in the form of by-product ammonium salts, and 5.2 MSCFD is recycled to the Claus reactor 2.

Bypass line 70 is provided to pass, as needed, a portion of the $H_2S$-containing gas from feed line 1 directly to the incinerator 6 where the $H_2S$ and other S-containing gases (COS, $CS_2$ etc.) are combusted to $SO_2$. Bypass line 70 is utilized during start-up in order to provide the requisite amount of $SO_2$ for reaction with $H_2S$ in the Claus reactor 2 and also in those instances during operation when the amount of $SO_2$ becomes insufficient to provide the required extent of reaction with $H_2S$ in the Claus reactor 2.

EXAMPLE 2

Figure 2:
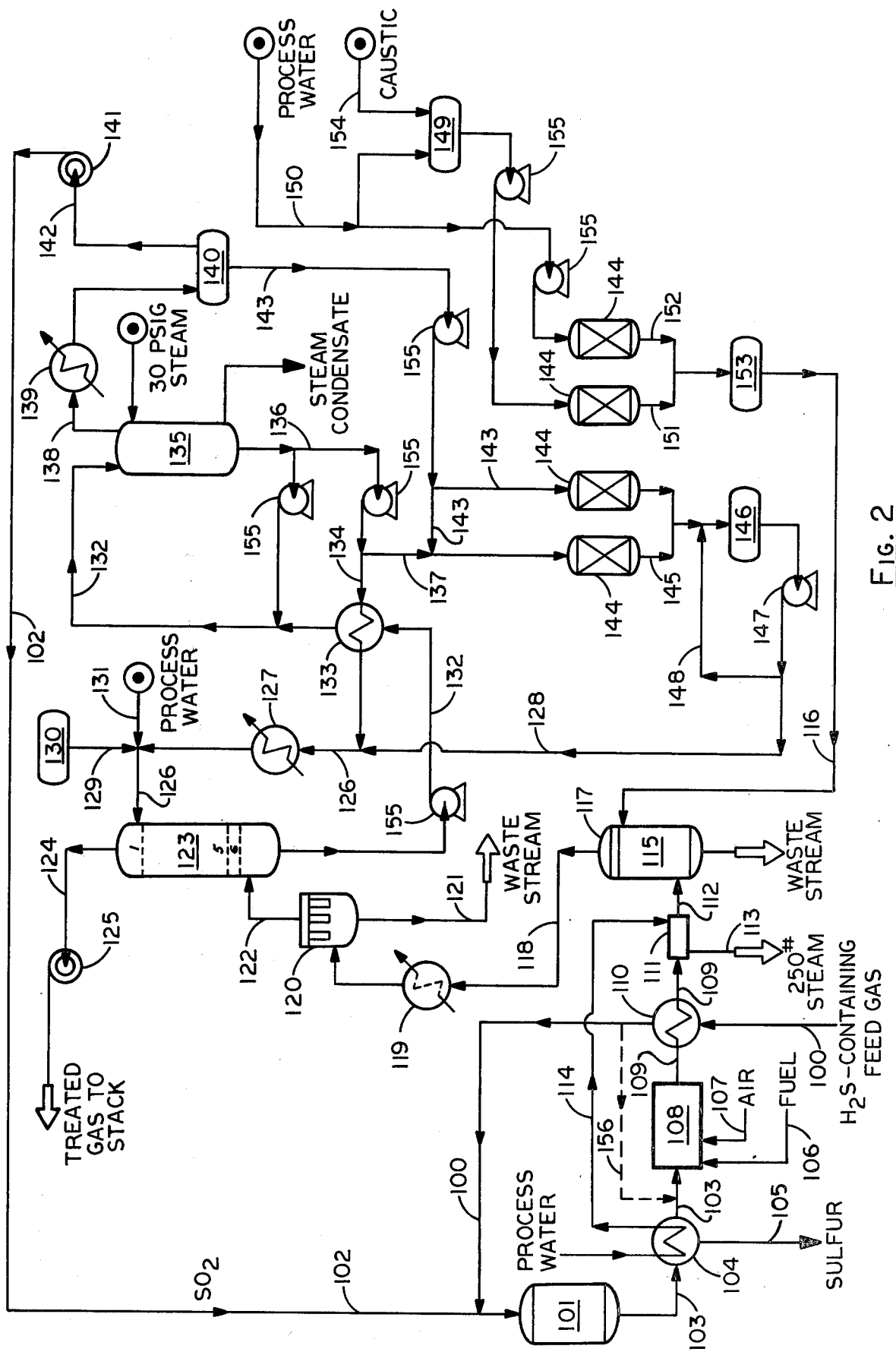
FIG. 2 is a flow diagram illustrating another embodiment of the invention utilizing a strong base anion exchange resin.

Referring to FIG. 2, 100 MSCFD of a very lean stream 100 of gas containing only 1% $H_2S$, 6% $H_2O$ and the balance $CO_2$, is sent to a Claus reactor 101. This stream is too lean for decent reaction with the stoichiometric 0.5 MSCFD of $SO_2$, so it is mixed instead with an excess, 0.9 MSCFD $SO_2$ from line 102 which drives the reaction to 52% yield of sulfur in terms of the entering $H_2S$. The tail gas stream 103 from reactor 101 contains 0.5 MSCFD $H_2S$, 0.6 MSCFD $SO_2$, and 6.7 MSCFD $H_2O$, along with 93 MSCFD $CO_2$ after sulfur is condensed out in condenser 104 and is removed via line 105. The tail gas stream 103 is combined with 14 MSCFD methane through line 106 and 184 MSCFD air through line 107 in the incinerator operating at a temperature of 1950° F, giving an incinerated product consisting of 1.1 MSCFD $SO_2$, 35 MSCFD $H_2O$, 107 MSCFD $CO_2$, 147 MSCFD $N_2$, and 7.3 MSCFD excess $O_2$ leaving the incinerartor 108 via stream 109. The stream 109 at a temperature of 1950° F is passed through a heat exchanger 110 wherein it heats incoming feed gas 100. Thence, it passes to a waste heat boiler 111 at about 1000° F and exits through stream 112 at about 600° F producing 250 psi steam in line 113 from water entering the boiler 111 through line 114. The exit temperature of stream 112 is well above the 500° F dew point of $H_2SO_4$ thus avoiding acid condensation which would create a difficult corrosion problem. The gas is then quenched in quench tower 115 with an alkaline waste-water stream 116 (produced as described hereinafter) to remove $SO_3$. The liquid and gas are separated in an $SO_3$ knock-out drum 117 at the top of the quench tower 115 and the liquid waste stream 115A is separated at the bottom.

The quenched gas stream 118 is cooled to 100° F (20° F below the absorber temperature) in the cooler 119 using cooling tower water. Condensation is removed in a high-efficiency demister 120 and is disposed of through waste stream 121. This step is necessary to minimize the carryover of sulfuric acid mist to the absorber.

The cool gas stream 122 enters the base of a six-tray absorber 123 where it countercurrently contacts the absorbent, aqueous TEA. The $SO_2$ content of the gas is reduced from about 10,500 to <200 ppmv (more or less depending on pollution regulations). The treated gas stream 124 leaving the top of the absorber has a 100° F dew point. It is sent to an induced draft blower 125 and then to the stack. The treated gas can be reheated with the incinerator tail gas stream 109 in a regenerative heat exchanger if required to control pluming and ensure buoyancy.

Lean absorbent stream 126, which has been cooled to 120° F cooler 127 and to which regenerated absorbent stream 128 and make-up absorbent stream 129 from make-up reservoir 130 and water stream 131 have been added, is fed into the top of the absorber 123. It passes downward, countercurrent to the gas stream, absorbing $SO_2$. The rich absorbent stream 132 exits the bottom of the absorber 123 and is heated to about 160° F in heat exchanger 133 by the lean absorbent stream 134 which is cooled to about 150° F. The rich absorbent stream 132 then enters the absorbent stripper 135 where water and $SO_2$ are evaporated at low pressure and moderate temperature. Stripper 135 is a falling-film type evaporator with indirect steam heating. The lean absorbent stream 136 is sent back to the absorber 123 via exchanger 133 and cooler 127, while a purge stream 137 is sent to regeneration for HSS= removal (to be described hereinafter). The stripper overhead stream 138 which is laden with water is condensed in condenser 139 and separated in separator 140. The wet $SO_2$ vapor stream 141 from the separator 140 is pumped by vacuum compressor 142 to the Claus reactor 101. The condensed water stream 143 is sent to the ion exchange regeneration system to be hereinafter described and/or to the purge stream 137.

The purge stream 137 of the circulating absorbent is treated by Amberlite IRA-910, a strong base anion exchange resin, to remove sulfate and any HSS= buildup in the system. The resin unit comprises four beds 144 operated on a four-hour total cycle of four equal time steps each comprising: 1. Absorbent exchange, 2. Absorbent displacement by water, 3. Regeneration by caustic, and 4. Caustic displacement by water.

The purge stream 137 is diluted with stripper overhead condensate 143 to reduce its density and viscosity for easier flow through the ion exchange beds 144 to avoid bed disruption. The diluted purge stream 137 is then passed through an ion exchange bed 144 to remove 80% of the HSS=, 65% of the $SO_2$ present and thus regenerate 80% of the TEA. The regenerated absorbent stream 128 is returned via line 145 to the absorber 123. Because the output from resin bed 144 is necessarily intermittent and because the water content will vary, a surge vessel 146 and a circulating pump 147 are provided to induce mixing via recycle loop 148.

While one ion exchange bed 144 is used for absorbent reclaiming, the others are regenerated by a three-step process which consists of:

(1) Water washing with condensate stream 143 to displace the absorbent from the bed 144. This water effluent is combined with the reclaimed absorbent in surge vessel 146 and mixed via the recycle loop 148.

(2) Regenerating the bed 144 with a 10 wt.% sodium hydroxide solution from sodium hydroxide reservoir 149 and (3) Water washing the bed 144 with process water stream 150 to displace and wash out excess caustic. The alkaline effluent streams 151 and 152 from steps (2) and (3), respectively, are used in the quench tower 115. An alkaline effluent surge tank 153 is provided to accommodate the intermittent nature of effluent streams 151 and 152. Make-up sodium hydroxide is supplied through line 154. Circulating pumps 155 are provided at appropriate locations to provide adequate circulation.

The effluent gas stream 124 amounts to 263 MSCFD on a dry basis and contains 200 ppm $SO_2$, or about 0.05 MSCFD, equivalent to 5.0% of the entering $H_2S$ in the feed gas stream 100. Of the $SO_2$ removed from that effluent stream 124, 0.9 MSCFD is recycled to the Claus reactor 101, while 0.17 MSCFD is rejected in the form of by-product sodium salts in waste stream 115A. The overall clean-up of the feed stream 100 is 95%.

Bypass line 156 is provided to pass, as needed, a portion of the $H_2S$-containing gas from feed line 100 directly to the incinerator 108 where the $H_2S$ and other S-containing gases (COS, $CS_2$ etc.) are combusted to $SO_2$. Bypass line 156 is utilized during start-up in order to provide the requisite amount of $SO_2$ for reaction with $H_2S$ in the Claus reactor 101 and also in those instances during operation when the amount of $SO_2$ becomes insufficient to provide the required extent of reaction with $H_2S$ in the Claus reactor 101.

EXAMPLE 3

Ordinarily, 100 MSCFD of a feed stream containing 50% $H_2S$ would be suitable for conventional Claus treatment in 3 stages to give 98.5% yield and a tail gas of 50 MSCFD CO$_2$ and 48.5 MSCFD H$_2$O, with 15,000 ppm sulfur compounds, 5,000 of which would be SO$_2$ and 10,000 of which would be H$_2$S. Although the overall yield would be good, the high concentration of H$_2$S in the tail gas would require further treatment, e.g., incineration and SO$_2$ scrubbing.

Alternatively, using the apparatus and procedures described in Example 1, 75% of the stream 1, e.g., 75 MSCFD, is led to the single stage Claus reactor 2, where it is combined with 17.6 MSCFD SO$_2$. The reaction gives 86% yield of sulfur which is condensed out in condenser 3 and removed via line 4. The tail gas stream 5 contains 5.3 MSCFD H$_2$S, 1.5 MSCFD SO$_2$, 36.6 MSCFD H$_2$O, and 37.5 MSCFD CO$_2$ and is combined with the other 25% of the feed stream, i.e., 12.5 MSCFD H$_2$S and 12.5 MSCFD CO$_2$ fed through line 70. The total H$_2$S is sufficient to support combustion without additional fuel. 167 MSCFD of air are added via line 8 for incineration, and the product, containing 19.4 MSCFD SO$_2$, is led to the SO$_2$ removal unit via line 9, heat exchanger 10, line 11, waste heat boiler 12 and pipe 14. About 200 MSCFD of gas containing 200 ppm SO$_2$, or 0.04 MSCFD (equivalent to less than 0.1% of the H$_2$S in the orginal feed) is vented via line 28. Of the 19.3 MSCFD SO$_2$ removed from that stream, about 1.7 MSCFD are converted into ammonia salts in the waste stream 20, and 17.6 MSCFD are recycled to the Claus reactor 2. Again, although the Claus reaction is giving only an 86% per pass yield, the total removal of sulfur is >99.9%.

What is claimed is:

1. In a process for the removal of hydrogen sulfide and the recovery of sulfur from a gas stream containing hydrogen sulfide comprising the steps of:
   (a) reacting a portion of the hydrogen sulfide of said gas stream with sulfur dioxide in a Claus reactor to produce sulfur, water and a second gas stream containing said sulfur, water and unreacted H$_2$S and SO$_2$;
   (b) condensing sulfur from said second gas stream;
   (c) thereafter oxidizing the unreacted hydrogen sulfide in said second gas stream to sulfur dioxide and water thereby forming a tail gas stream containing said sulfur dioxide;
   (d) contacting said tail gas stream with a mainstream of an aqueous absorbent solution to remove sulfur dioxide from said tail gas stream and form a rich aqueous absorbent solution enriched in sulfur dioxide removed from said tail gas stream;
   (e) moving a mainstream of said rich aqueous absorbent solution to a stripping zone where sulfur dioxide is removed to form a lean aqueous absorbent solution depleted in sulfur dioxide content;
   (f) recirculating the sulfur dioxide removed in step (e) to step (a) for reaction with hydrogen sulfide; and
   (g) recycling a mainstream of said lean aqueous absorbent solution from the stripping zone of step (e) to step (d) for re-contact with said tail gas stream; the improvement comprising
   (1) carrying out the reaction of step (a) in only one Claus reactor;
   (2) using an aqueous alkanolamine solution as the absorbent solution in step (d);
   (3) performing the stripping of step (e) so that the residence time of the liquid alkanolamine solution in said stripping zone is from about 3 to 30 minutes and said stripping zone is operated at a reduced pressure of about 50 to about 350 mm. Hg. and a temperature of about 80° to 100° C. to thereby minimize the formation of sulfate, thiosulfate and thionate anions;
   (4) separating from said mainstream of lean aqueous alkanolamine a portion of said aqueous alkanolamine solution containing said sulfate, thiosulfate and thionate anions;
   (5) contacting said separated portion with an anion exchange resin having anions displaceable by said sulfate, thiosulfate and thionate anions to remove same from said portion whereby the anions of the resin are replaced by said sulfate, thiosulfate and thionate anions;
   (6) returning said portion after contact with said anion exchange resin to one of said mainstreams; and
   (7) regenerating said anion exchange resin by contacting it with an aqueous alkaline inorganic hydroxide to replace the sulfate, thiosulfate and thionate anions on said resin with hydroxyl anions thereby forming a waste stream containing said sulfate, thiosulfate and thionate anions.

2. Process as claimed in claim 1 wherein up to 33 vol.% of said first-mentioned gas stream is passed directly to step (c) for oxidizing its hydrogen sulfide content to sulfur dioxide to provide increased amounts of sulfur dioxide for recirculation in step (f) from step (e) to step (a).

* * * * *